(12) United States Patent
Zhang et al.

(10) Patent No.: US 12,511,246 B2
(45) Date of Patent: Dec. 30, 2025

(54) DATA PROCESSING SYSTEM

(71) Applicant: INTELLIGO TECHNOLOGY INC., Zhubei (TW)

(72) Inventors: Yu-Cheng Zhang, Zhubei (TW); Hsuan-Yi Hou, Zhubei (TW); Hong-Ching Chen, Zhubei (TW); Tsung-Liang Chen, Zhubei (TW)

(73) Assignee: INTELLIGO TECHNOLOGY INC., Zhubei (TW)

( * ) Notice: Subject to any disclaimer, the term of this patent is extended or adjusted under 35 U.S.C. 154(b) by 20 days.

(21) Appl. No.: 18/660,396

(22) Filed: May 10, 2024

(65) Prior Publication Data

US 2025/0225089 A1 Jul. 10, 2025

(30) Foreign Application Priority Data

Jan. 5, 2024 (TW) ................................. 113100511

(51) Int. Cl.
*G06F 13/20* (2006.01)

(52) U.S. Cl.
CPC .................................... *G06F 13/20* (2013.01)

(58) Field of Classification Search
None
See application file for complete search history.

(56) References Cited

U.S. PATENT DOCUMENTS

| 5,197,101 | A | * | 3/1993 | Mok | G11B 20/00007 360/32 |
| 6,151,653 | A | * | 11/2000 | Lin | G06F 13/4009 710/305 |
| 7,337,260 | B2 | * | 2/2008 | Anjo | G06F 13/364 710/307 |
| 8,327,034 | B2 | * | 12/2012 | Nystad | G06F 13/4221 711/202 |
| 10,713,207 | B2 | * | 7/2020 | Payment | G06F 1/10 |
| 2005/0210163 | A1 | * | 9/2005 | Suzuki | G06F 13/1673 710/22 |
| 2021/0155764 | A1 | * | 5/2021 | Martens | C08J 3/243 |

FOREIGN PATENT DOCUMENTS

CN 106649166 A 5/2017

* cited by examiner

*Primary Examiner* — Elias Mamo
(74) *Attorney, Agent, or Firm* — McClure, Qualey & Rodack, LLP

(57) ABSTRACT

The invention discloses a data processing system, which includes a master device, a slave device and a meta-precision translation unit. The slave device is connected to the master device through a bus and performs two-way transmission of data with the master device. The meta-precision translation unit is disposed on the bus and located between the master device and the slave device and used to selectively perform format conversion on the data according to a bus command.

14 Claims, 4 Drawing Sheets

DATA PROCESSING SYSTEM

BACKGROUND OF THE INVENTION

1. Field of the Invention

The invention relates to data processing; in particular, to a data processing system that disposes a meta-precision translation unit on a bus and determines different format conversions through addressing.

2. Description of the Prior Art

As shown in FIG. 1, a conventional data processing system 1 includes a master device MR and a slave device SL. The data is transmitted between the master device MR and the slave device SL through a bus BUS. For example, the master device MR can be a central processing unit (CPU) or an accelerator, and the slave device SL can be a memory device, but not limited to this.

However, since different formats of master device MR have different precision requirements, they cannot jointly process the same data. If the data is stored in different formats or only high-precision algorithm is used, the storage space of memory will be wasted; if only low-precision algorithm is used, insufficient precision will occur.

Therefore, the above-mentioned problems encountered by the prior art still need to be solved.

SUMMARY OF THE INVENTION

Therefore, the invention provides a data processing system that disposes a meta-precision translation unit on a bus and determines different format conversions through addressing to effectively solve the above-mentioned problems of the prior arts.

A preferred embodiment of the invention is a data processing system. In this embodiment, the data processing system includes a master device, a slave device and a meta-precision translation unit. The slave device is connected to the master device through a bus and performs two-way transmission of data with the master device. The meta-precision translation unit is disposed on the bus and located between the master device and the slave device and used to selectively perform format conversion on the data according to bus command.

In an embodiment, when the master device outputs data in the first format, the meta-precision translation unit converts the format of the data according to the bus command and then outputs data in the second format to the slave device.

In an embodiment, when the master device outputs data in the second format, the meta-precision translation unit directly transmits the data in the second format to the slave device according to the bus command.

In an embodiment, when the slave device outputs data in the second format, the meta-precision translation unit directly transmits the data in the second format to the master device according to the bus command.

In an embodiment, when the slave device outputs data in the second format, the meta-precision translation unit converts the format of the data according to the bus command and then outputs the data in the first format to the master device.

In an embodiment, the meta-precision translation unit includes a plurality of conversion circuits, and the plurality of conversion circuits corresponds to a plurality of virtual address space respectively.

In an embodiment, if any one of the plurality of virtual addressing spaces is read or written, corresponding data format conversion is performed through a conversion circuit in the plurality of conversion circuits corresponding to the any one of the plurality of virtual addressing spaces.

In an embodiment, the plurality of virtual address spaces corresponds to a plurality of normal address spaces respectively.

In an embodiment, if any one of the plurality of normal address spaces is read or written, no data format conversion is performed through the plurality of conversion circuits.

In an embodiment, the meta-precision translation unit performs the format conversion on the data to convert the data from the first format to the second format.

In an embodiment, the meta-precision translation unit performs the format conversion on the data to convert the data from the second format to the first format.

In an embodiment, the meta-precision translation unit and the slave device are integrated into one module.

In an embodiment, when the meta-precision translation unit receives a first data with a high bit number from the master device, the meta-precision translation unit converts the first data with high bit number into the first data with low bit number and outputs the first data with low bit number to the slave device.

In an embodiment, the meta-precision translation unit includes a plurality of first conversion circuits and a first multiplexer. The plurality of first conversion circuits is configured to perform a plurality of format conversions on the first data with high bit number respectively to output a plurality of converted data with low bit number. The first multiplexer is coupled to the plurality of first conversion circuits and configured to receive the plurality of converted data with low bit number and output the first data with low bit number.

In an embodiment, when the meta-precision translation unit receives a second data with low bit number from the slave device, the meta-precision translation unit converts the second data with low bit number into the second data with high bit number and then outputs the second data with high bit number to the master device.

In an embodiment, the meta-precision translation unit includes a plurality of second conversion circuits and a second multiplexer. The plurality of second conversion circuits is configured to perform a plurality of format conversions on the second data with low bit number respectively to output a plurality of converted data with high bit number. The second multiplexer is coupled to the plurality of second conversion circuits and configured to receive the plurality of converted data with high bit number and output the second data with high bit number.

Compared to the prior art, the data processing system of the invention can selectively convert the format of the data transmitted between the master device and the slave device through the meta-precision translation unit disposed on the bus according to the bus command, without changing the original system circuit structure. It can correspondingly convert metadata in high-precision format or low-precision format in response to the different precision requirements of various formats of master devices, so that different formats of master devices can jointly process the same metadata. Therefore, both cost and precision can be taken into consideration, and it can also effectively improve the overall computing power of the system.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

According to a first preferred embodiment of the invention, a data processing system is provided with a meta-precision translation unit on a bus and determines different format conversions through addressing, but not limited to this.

Figure 1:
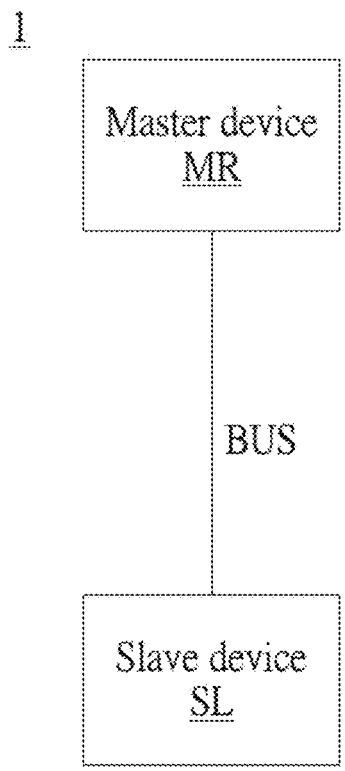
FIG. 1 illustrates a schematic diagram of a conventional data processing system.
Figure 2:
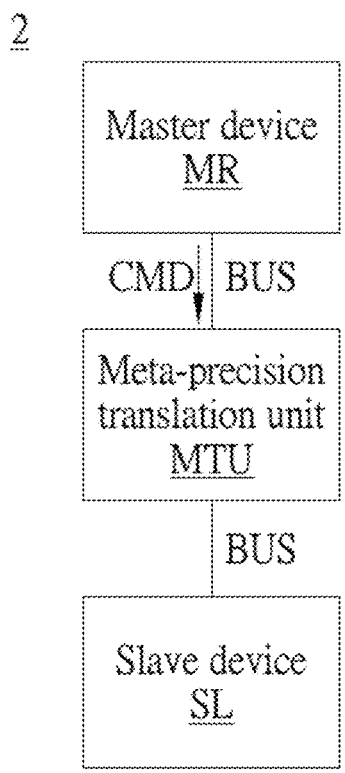
FIG. 2 illustrates a schematic diagram of a data processing system of the first preferred embodiment of the invention.

Please refer to FIG. 2. FIG. 2 illustrates a schematic diagram of the data processing system in this embodiment. As shown in FIG. 2, the data processing system 2 includes a master device MR, a slave device SL and a meta-precision translation unit MTU. The master device MR and the slave device SL are connected to each other through a bus BUS. The meta-precision translation unit MTU is disposed on the bus BUS and located between the master device MR and the slave device SL.

It should be noted that when bidirectional transmission of data is performed between the master device MR and the slave device SL, the meta-precision translation unit MTU will selectively perform format conversion on the data according to a bus command CMD. Next, detailed description will be given through the following examples.

Figure 3A:
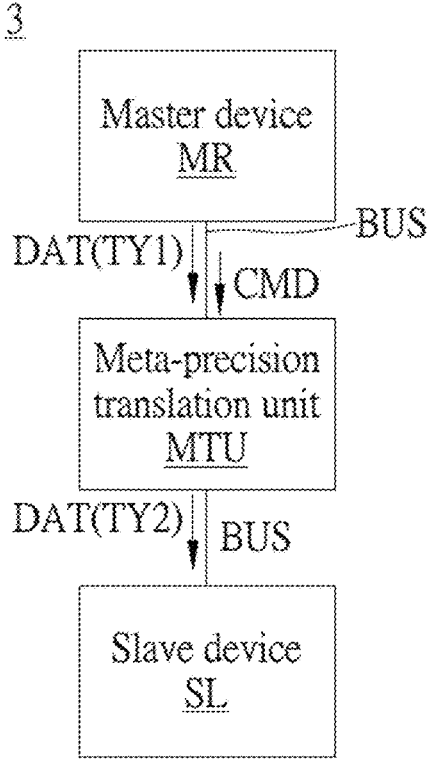
FIG. 3A and FIG. 3B illustrate schematic diagrams of a data processing system of the second preferred embodiment of the invention.
Figure 3B:
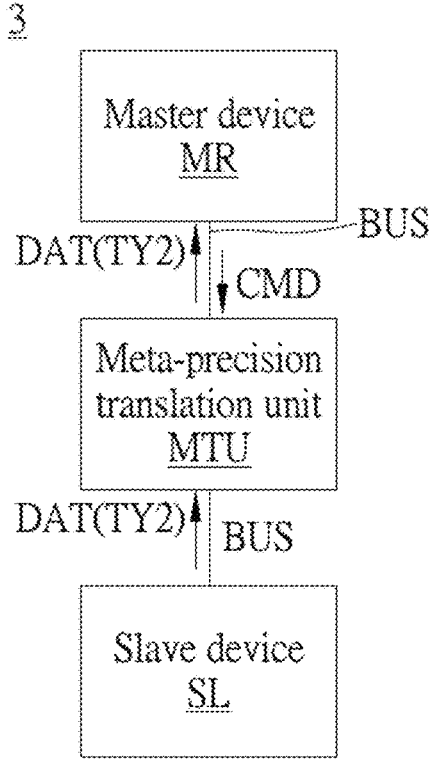

Please refer to FIG. 3A and FIG. 3B. In the data processing system 3, when the master device MR wants to write the data DAT (TY1) in a first format to a virtual address space of the slave device SL through the bus BUS, the meta-precision translation unit MTU disposed on the bus BUS receives the data DAT (TY1) in the first format and converts the data DAT (TY1) in the first format into the data DAT (TY2) in a second format according to the bus command CMD and then outputs the data DAT (TY2) in the second format to the virtual address space of the slave device SL. When the master device MR wants to read data from a normal address space of the slave device SL through the bus BUS, the meta-precision translation unit MTU disposed on the bus BUS receives the data DAT (TY2) in the second format from the normal address space of the slave device SL and directly outputs the data DAT (TY2) in the second format to the main device MR according to the bus command CMD.

Figure 4A:
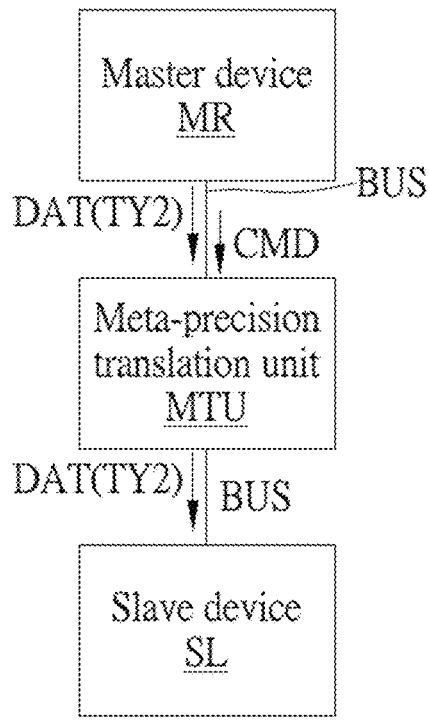
FIG. 4A and FIG. 4B illustrate schematic diagrams of a data processing system of the third preferred embodiment of the invention.
Figure 4B:
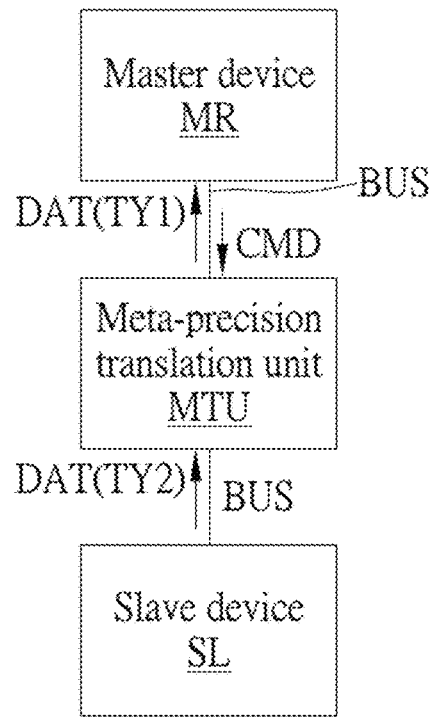

Please refer to FIG. 4A and FIG. 4B. In the data processing system 4, when the master device MR wants to write the data DAT (TY2) in the second format to the normal address space of the slave device SL through the bus BUS, the meta-precision translation unit MTU disposed on the bus BUS receives the data DAT (TY2) in the second format and directly outputs the data DAT (TY2) in the second format to the normal address space of the slave device SL according to the bus command CMD. When the master device MR wants to read data from the slave device SL through the bus BUS, the meta-precision translation unit MTU disposed on the bus BUS receives the data DAT (TY2) in the second format from the virtual address space of the slave device SL and converts the data DAT (TY2) in the second format into the data DAT (TY1) in the first format and then outputs the data DAT (TY1) in the first format to the main device MR according to the bus command CMD.

According to the above two embodiments, it can be seen that the main device MR can output the data DAT (TY1) with the first format and read the data DAT (TY2) with the second format, or the main device MR can output the data DAT (TY2) with the second format and read the data DAT (TY1) with the first format. By doing so, the main device MR can realize the format conversion of the data, for example, the format of the data can be converted from the floating point format to the fixed point format, or vice versa, the format of the data can be converted from the fixed point format to the floating point format, but not limited to this. The actual operating conditions of the above two embodiments can be summarized in Table 1 below:

TABLE 1

| Schematic diagram | Data direction | Read/write position | Whether to format conversion? |
|---|---|---|---|
| FIG. 3A | Master device MR writes to slave device SL | From virtual address space of slave device SL | Yes (First format TY1 => Second format TY2) |
| FIG. 4A | Master device MR writes to slave device SL | From normal address space of slave device SL | No (Maintain second format TY2) |
| FIG. 3B | Master device MR reads from slave device SL | From normal address space of slave device SL | No (Maintain second format TY2) |
| FIG. 4B | Master device MR reads from slave device SL | From virtual address space of slave device SL | Yes (Second format TY2 => First format TY1) |

Figure 5:
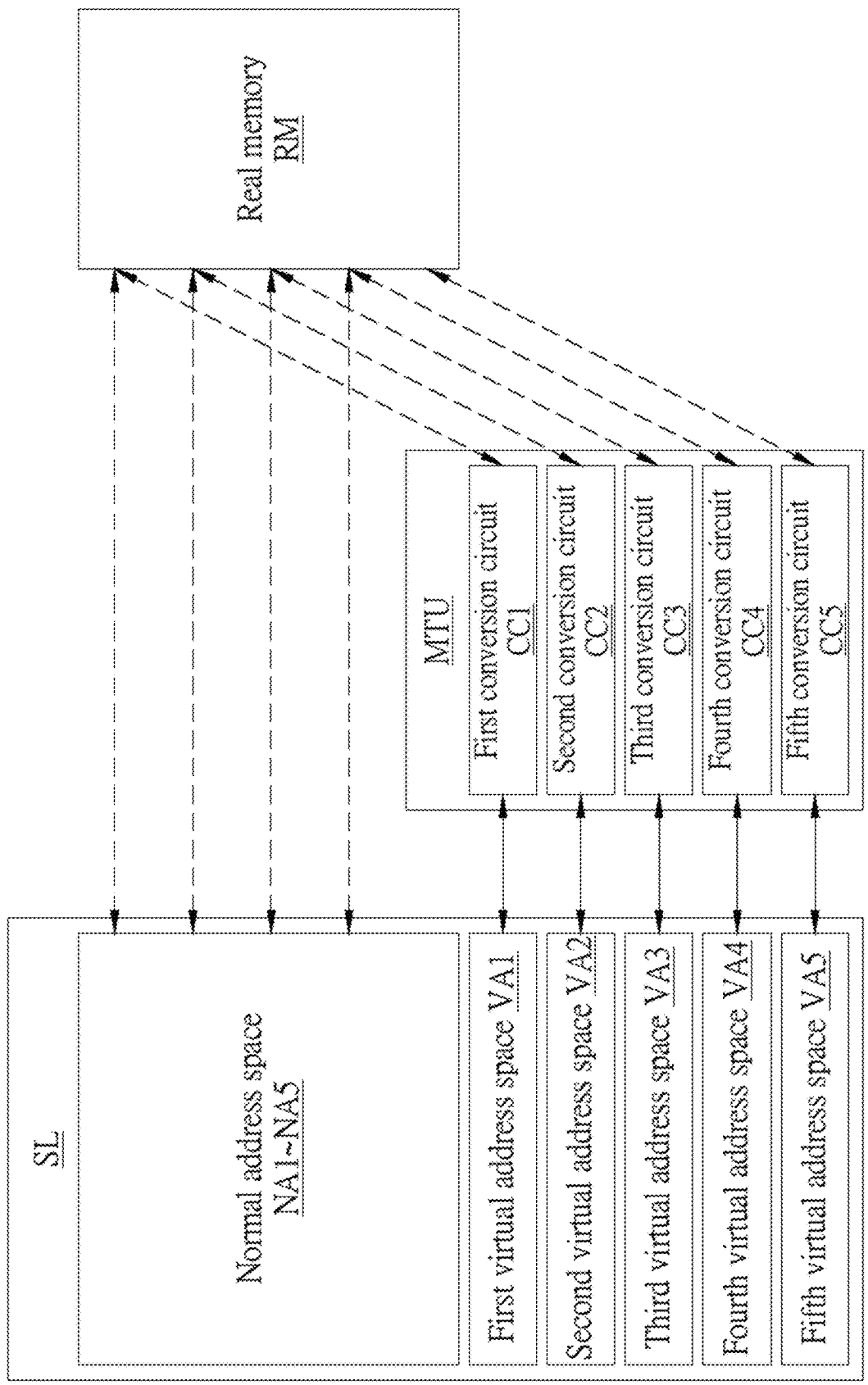
FIG. 5 illustrates a schematic diagram showing that the meta-precision translation unit includes a plurality of conversion circuits corresponding to a plurality of virtual address spaces respectively.

Regarding the normal address space and the virtual address space of the slave device SL mentioned above, please refer to FIG. 5. As shown in FIG. 5, in the data processing system 5, the slave device SL includes a plurality of normal address spaces NA1~NA5 and a plurality of virtual address spaces VA1~VA5. The plurality of virtual address spaces VA1~VA5 correspond to the plurality of normal address spaces NA1~NA5 respectively. The meta-precision translation unit MTU includes a plurality of conversion circuits CC1~CC5 and the plurality of conversion circuits CC1~CC5 correspond to the plurality of virtual address spaces VA1~VA5 respectively.

For example, when the master device MR wants to perform a read/write operation on any normal address space (such as the normal address space NA1) among the plurality of normal address spaces NA1~NA5, there is no need to perform data format conversion through the plurality of conversion circuits CC1~CC5 of the meta-precision translation unit MTU, so the meta-precision translation unit MTU can be bypassed. When the master device MR wants to perform a read/write operation on any virtual address space (for example, the virtual address space VA1) among the plurality of virtual address spaces VA1~VA5, it must perform corresponding data format conversion through the conversion circuit (for example, the conversion circuit CC1) corresponding to the virtual address space VA1 among the plurality of conversion circuits CC1~CC5 of the meta-precision conversion unit MTU.

Figure 6:
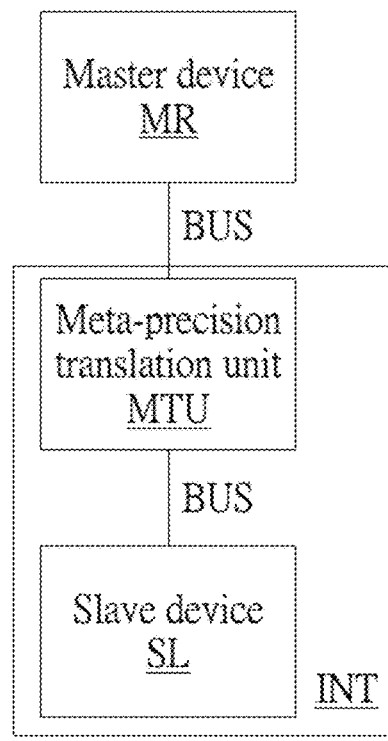
FIG. 6 illustrates a schematic diagram of the meta-precision translation unit and the slave device integrated into one module.

Referring to FIG. 6, in another embodiment, the meta-precision translation unit MTU in the data processing system 6 can also be integrated with the slave device SL into one module INT, thereby reducing the system volume.

Figure 7:
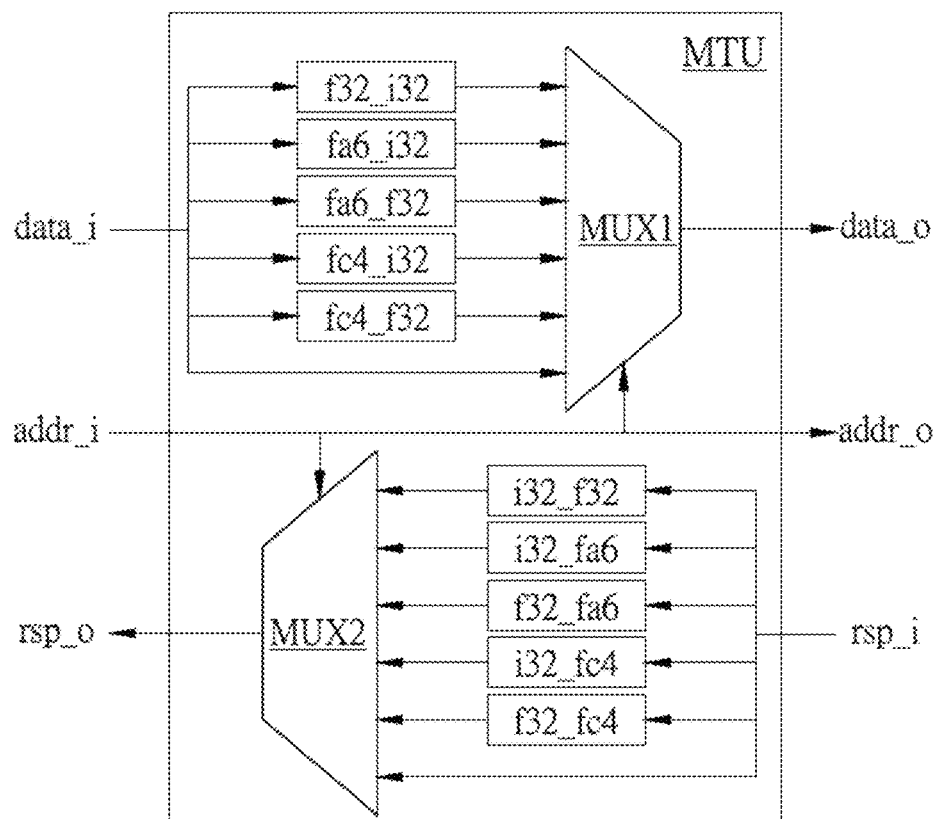
FIG. 7 illustrates a schematic diagram of the meta-precision translation unit converting the number of bits of data.

Please refer to FIG. 7. FIG. 7 illustrates a schematic diagram of the meta-precision translation unit converting the number of bits of data.

As shown in FIG. 7, the meta-precision translation unit MTU can include a plurality of first conversion circuits f32_i32, fa6_i32, fa6_f32, fc4_i32 and fc4_f32 and a first multiplexer MUX1. The first multiplexer MUX1 is coupled to the plurality of first conversion circuits f32_i32, fa6_i32, fa6_f32, fc4_i32 and fc4_f32. When the meta-precision conversion unit MTU receives the first data data_i with high number of bits from the master device MR, the plurality of first conversion circuits f32_i32, fa6_i32, fa6_f32, fc4_i32 and fc4_f32 are used to perform a plurality of format conversions on the data data_i with high number of bits respectively and then output the first data data_o with low number of bits to the slave device SL through the first multiplexer MUX1 controlled by the addressing signal addr_i.

Similarly, the meta-precision translation unit MTU can also include a plurality of second conversion circuits i32_f32, i32_fa6, f32_fa6, i32_fc4 and f32_fc4 and a second multiplexer MUX2. The second multiplexer MUX2 is coupled to the plurality of second conversion circuits i32_f32, i32_fa6, f32_fa6, i32_fc4 and f32_fc4. When the meta-precision translation unit MTU receives the second data rsp_i with low number of bits from the slave device SL, the plurality of second conversion circuits i32_f32, i32_fa6, f32_fa6, i32_fc4 and f32_fc4 are used to perform a plurality of format conversions on the second data rsp_i with low number of bits and then output the second data rsp_o with high number of bits to the master device MR through the second multiplexer MUX2 controlled by the addressing signal addr_i. By doing so, the master device MR can realize the conversion of the number data bit, but not limited to this.

In practical applications, the plurality of first conversion circuits f32_i32, fa6_i32, fa6_f32, fc4_i32 and fc4_f32 are used to respectively convert the format of the first data data_i from f32 to i32, from fa6 to i32, from fa6 to f32, from fc4 to i32 and from fc4 to f32, but not limited to this. The plurality of second conversion circuits i32_f32, i32_fa6, f32_fa6, i32_fc4 and f32_fc4 are used to respectively convert the format of the second data rsp_i from i32 to f32, from i32 to fa6, from f32 to fa6, from i32 to fc4 and from f32 to fc4, but not limited to this.

Compared to the prior art, the data processing system of the invention can selectively convert the format of the data transmitted between the master device and the slave device through the meta-precision translation unit disposed on the bus according to the bus command, without changing the original system circuit structure. It can correspondingly convert metadata in high-precision format or low-precision format in response to the different precision requirements of various formats of master devices, so that different formats of master devices can jointly process the same metadata. Therefore, both cost and precision can be taken into consideration, and it can also effectively improve the overall computing power of the system.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing system, comprising:
   a master device;
   a slave device, connected to the master device through a bus and configured to perform a two-way transmission of data with the master device; and
   a meta-precision translation unit, disposed on the bus and located between the master device and the slave device and configured to selectively perform a format conversion on the data according to bus command;
   wherein the meta-precision translation unit comprises a plurality of conversion circuits, and the plurality of conversion circuits corresponds to a plurality of virtual address spaces respectively.

2. The data processing system of claim 1, wherein when the master device outputs the data in a first format, the meta-precision translation unit converts the format of the data according to the bus command and then outputs the data in a second format to the slave device.

3. The data processing system of claim 1, wherein when the master device outputs the data in a second format, the meta-precision translation unit directly transmits the data in the second format to the slave device according to the bus command.

4. The data processing system of claim 2, wherein when the slave device outputs the data in the second format, the meta-precision translation unit directly transmits the data in the second format to the master device according to the bus command.

5. The data processing system of claim 3, wherein when the slave device outputs the data in the second format, the meta-precision translation unit converts the format of the data according to the bus command and then outputs the data in the first format to the master device.

6. The data processing system of claim 1, wherein if any one of the plurality of virtual addressing spaces is read or written, corresponding data format conversion is performed through a conversion circuit in the plurality of conversion circuits corresponding to the any one of the plurality of virtual addressing spaces.

7. The data processing system of claim 1, wherein the plurality of virtual address spaces corresponds to a plurality of normal address spaces respectively.

8. The data processing system of claim 7, wherein if any one of the plurality of normal address spaces is read or written, no data format conversion is performed through the plurality of conversion circuits.

9. The data processing system of claim 1, wherein the meta-precision translation unit performs the format conversion on the data to convert the data from a first format to a second format.

10. The data processing system of claim 1, wherein the meta-precision translation unit performs the format conversion on the data to convert the data from a second format to a first format.

11. The data processing system of claim 1, wherein the meta-precision translation unit and the slave device are integrated into one module.

12. A data processing system, comprising:
a master device;
a slave device, connected to the master device through a bus and configured to perform a two-way transmission of data with the master device; and
a meta-precision translation unit, disposed on the bus and located between the master device and the slave device and configured to selectively perform a format conversion on the data according to bus command;
wherein when the meta-precision translation unit receives a first data with high bit number from the master device, the meta-precision translation unit converts the first data with high bit number into the first data with low bit number and outputs the first data with low bit number to the slave device, wherein the meta-precision translation unit comprises:
a plurality of first conversion circuits, configured to perform a plurality of format conversions on the first data with high bit number respectively to output a plurality of converted data with low bit number; and
a first multiplexer, coupled to the plurality of first conversion circuits and configured to receive the plurality of converted data with low bit number and output the first data with low bit number.

13. The data processing system of claim 12, wherein when the meta-precision translation unit receives a second data with low bit number from the slave device, the meta-precision translation unit converts the second data with low bit number into the second data with high bit number and then outputs the second data with high bit number to the master device.

14. The data processing system of claim 13, wherein the meta-precision translation unit comprises:
a plurality of second conversion circuits, configured to perform a plurality of format conversions on the second data with low bit number respectively to output a plurality of converted data with high bit number; and
a second multiplexer, coupled to the plurality of second conversion circuits and configured to receive the plurality of converted data with high bit number and output the second data with high bit number.

* * * * *